United States Patent [19]

Erwin

[11] 4,269,511
[45] May 26, 1981

[54] APPARATUS AND METHOD FOR MEASURING THE MAGNITUDE OF POLARIZATION OF LIGHT

[75] Inventor: Phillip Erwin, Libertyville, Ill.

[73] Assignee: Abbott Laboratories, North Chicago, Ill.

[21] Appl. No.: 12,252

[22] Filed: Feb. 15, 1979

[51] Int. Cl.³ .............................. G02F 1/13; G01J 4/00
[52] U.S. Cl. .................................. 356/368; 350/331 R
[58] Field of Search ............... 350/331, 150; 356/364, 356/365, 366, 367, 368; 250/225

[56] References Cited

U.S. PATENT DOCUMENTS

| | | | |
|---|---|---|---|
| 3,157,727 | 11/1964 | Hardy et al. | 356/368 |
| 3,230,820 | 1/1966 | Wisnieff | 356/368 |
| 3,345,907 | 10/1967 | Wada | 356/367 |
| 3,356,438 | 12/1967 | Macek et al. | 350/150 |
| 3,501,220 | 3/1970 | Bernal et al. | 350/150 |
| 3,520,617 | 7/1970 | Webb | 356/365 |
| 3,646,331 | 2/1972 | Lord | 356/326 |
| 3,749,474 | 7/1973 | Cartmell | 350/331 |

OTHER PUBLICATIONS

Carroll et al., "Measurement of Optical Activity: New Approaches", *Science*, vol. 142 (Oct. 11 1963) pp. 200–208.

*Primary Examiner*—R. A. Rosenberger
*Attorney, Agent, or Firm*—Merriam, Marshall & Bicknell

[57] ABSTRACT

An accurate, relatively low cost and reliable apparatus and method for measuring the magnitude or degree of polarization of light, particularly adaptable to the measurement of fluorescence polarization. An electric field in sequentially applied to a field-effect liquid crystal to sequentially apply respective perpendicular polarization components from a light source to a fixed polarizer having a fixed plane of polarization. The respective polarization components are sequentially applied to detector and measuring apparatus for determining the magnitude of polarization. Memory means are included for storing a correction factor to compensate for polarization rotation errors due to the liquid crystal. Stored in the memory means is a correction factor for a range of measured values, the correction factor being obtained by direct comparisons with expected values for known polarizations.

2 Claims, 4 Drawing Figures

APPARATUS AND METHOD FOR MEASURING THE MAGNITUDE OF POLARIZATION OF LIGHT

This invention relates to apparatus and methods for measuring the magnitude or degree of polarization of light, and in particular to relatively low cost, yet accurate instrumentation useful in the measurement of fluorescence polarization.

BACKGROUND OF THE INVENTION

Reference may be made to the following U.S. Pat. Nos. of interest: 3,535,021; 3,767,287; 3,817,634; 3,901,603; 3,910,680; 3,912,369; 3,927,930; 3,938,878; and 4,053,207.

In some instrument applications, it is necessary to measure the magnitude (sometimes referred to herein as the "degree") of polarization of light containing multiple components with different orientations of electric field. For practical reasons, the polarization in the case of fluorescent light normally is described by measuring the intensity of light at two orientations, Z and Y, and calculating the magnitude or degree of polarization, P, as the ratio of $(I_z - I_y)/(I_z + I_y)$, or rearranged as $(R-1)/(R+1)$, where $R = I_z/I_y$, and wherein $I_z$ is the intensity of light with the electric field vector parallel to the electric field vector of the exciting light, and $I_y$ is the intensity of light with the electric vector perpendicular to the electric vector of the exciting light.

In the prior art, there exists accurate, but relatively expensive instruments wherein the measurement of $I_y$ and $I_z$ can be performed by passing the light through a polarizer to a detector and measuring one component such as $I_y$, and then rotating the polarizer 90° and measuring the second component, $I_z$. In such current instruments, the operator must normally rotate the polarizer in order to obtain the two measurements. An alternative is to rotate the polarizer automatically using a mechanism such as a stepping motor, however, such mechanisms add to the cost and detract from the reliability of such an instrument. An alternative technique is to use two detectors simultaneously, one with a polarizer oriented to pass Z-polarized light, and the second detector with a polarizer oriented to pass Y-polarized light. Such a system adds the expense of an additional detector, polarizer, and other optics and would not be consistent with an attempt to provide a desired low cost, yet accurate and reliable instrument for measuring the magnitude of polarization.

SUMMARY OF THE INVENTION

In accordance with the principles of the present invention, there is provided an accurate, relatively low cost and reliable apparatus and method for measuring the magnitude or degree of polarization of light, and particularly adaptable to the measurement of fluorescence polarization. A field-effect liquid crystal cell is placed intermediate to a source of light and a polarizer. Without an applied electric field, the liquid crystal rotates and polarization of light approximately 90 degrees and one component of the light can pass through the polarizer. When the electric field is applied to the liquid crystal cell, no rotation occurs, and the second component passes through the polarizer. Thus, the previously mentioned ratio R is derived from the detected respected values of $I_y$ and $I_z$.

Memory means are included to store a plurality of correction factors used in calibrating the apparatus with respect to standards using known polarizations. The standards are used to form a correction curve, by which all subsequent measurements of the ratio R are corrected to compensate for inherent liquid crystal polarization rotational errors. Therefore, once the calibration information has been stored in the memory means, the apparatus and method of the present invention automatically provides the required correction factor for a respective derived ratio R, and thereafter automatically calculates the magnitude or degree of polarization, P.

Liquid crystals are readily available devices of relatively low cost. However, their use in measuring the magnitude of polarization until now has been rejected since the inherent rotational error in a liquid crystal results in the measurement of polarization values which are not as accurate as those obtained with a conventional fluorometer with rotating polarizer. Thus, the invention provides a very accurate, low cost and reliable apparatus and method for measuring the degree of light polarization. For instance, the magnitude or degree of polarization, P, as defined above is normally between 0 and 0.5 for a usual range of fluorescence polarization. Utilizing the principles of the present invention, it was found that in a constructed embodiment thereof, when the incident light polarization was near zero, there was provided a polarization measurement of 0.0 with a standard deviation of plus or minus 0.0005, whereas at the 0.5 end of the range, there was provided a polarization measurement of 0.5 plus or minus 0.001.

It is therefore to be particularly noted that the present invention provides accurate, relatively inexpensive and reliable apparatus and method for determining the polarization of light without rotating the polarizer, and with only one detector and one polarizer.

DETAILED DESCRIPTION

Figure 1:
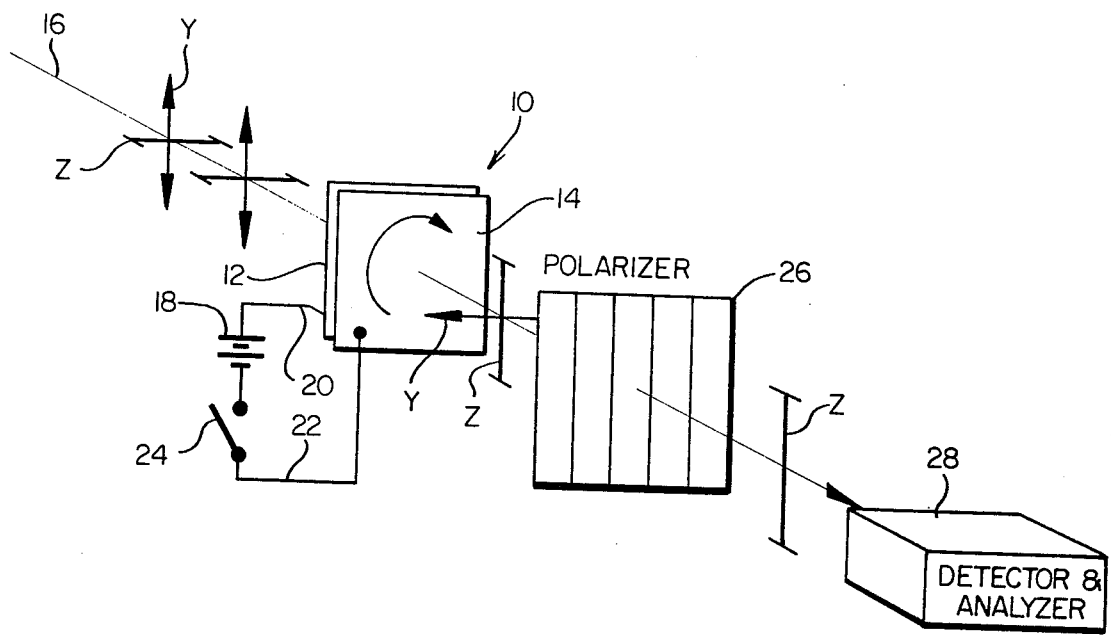
FIG. 1 illustrates a liquid crystal followed by a polarizer and detection/measurement apparatus in obtaining one polarization component of light in accordance with the principles of the present invention.

FIG. 1 illustrates a commonly available liquid crystal cell 10 having opposite cell walls 12 and 14 with the cell being filled with a thin layer of nematic liquid crystals. Coating of the inner cell walls with an electroconductive material orients the liquid crystal molecules so that the cell rotates the plane of vibration of light by 90°. If a voltage typically of somewhat more than three volts is applied to the cell, the associated electric field is sufficient to prevent polarization rotation of light passing through the cell.

Light 16 from a light source such as fluorescent light obtained by exciting a fluorescent material, is illustrated for convenience with the two polarization components Z and Y. It is understood, of course, that the light 16 contains many components with different orientations of electric field, whereas only the components at the two orientations Z and Y have been illustrated. As described previously, normally the degree of polarization is described by measuring the intensity of light at the orientations Z and Y and calculating the degree of polarization, P, as P equals $(I_z-I_y)/(I_z+I_y)$, which equals $(R-1)/(R+1)$, wherein $R=I_z/I_y$, and $I_z$ is the intensity of light of the electric field component in orientation Z, and $I_y$ is the intensity of light of the electric field component in orientation Y. It is understood, of course, that the two orientations Z and Y are perpendicular to each other and to the incident light axis, X, coinciding with the light 16.

An electrical power source 18 may be connected through lines 20 and 22 to the opposite walls of the liquid crystal cell upon closing of switch 24 to apply an electric field between the cell walls. It is a well-known property of liquid crystals, such as liquid crystal 10 that if no electric field is applied to the cell walls, such as is illustrated in FIG. 1, the light 16 impinging on cell wall 12 will be rotated 90° upon leaving cell wall 14 to achieve the orientation shown opposite cell wall 14 in FIG. 1. This 90° rotation places the Z component in line with the plane of polarization of a polarizer 26, such that only the Z component passes through the polarizer and is coupled to a detector and analyzer 28. Polarizer 26 is fixed in position and includes a fixed plane of polarization indicated schematically by the vertical lines in FIGS. 1 and 2.

Figure 2:
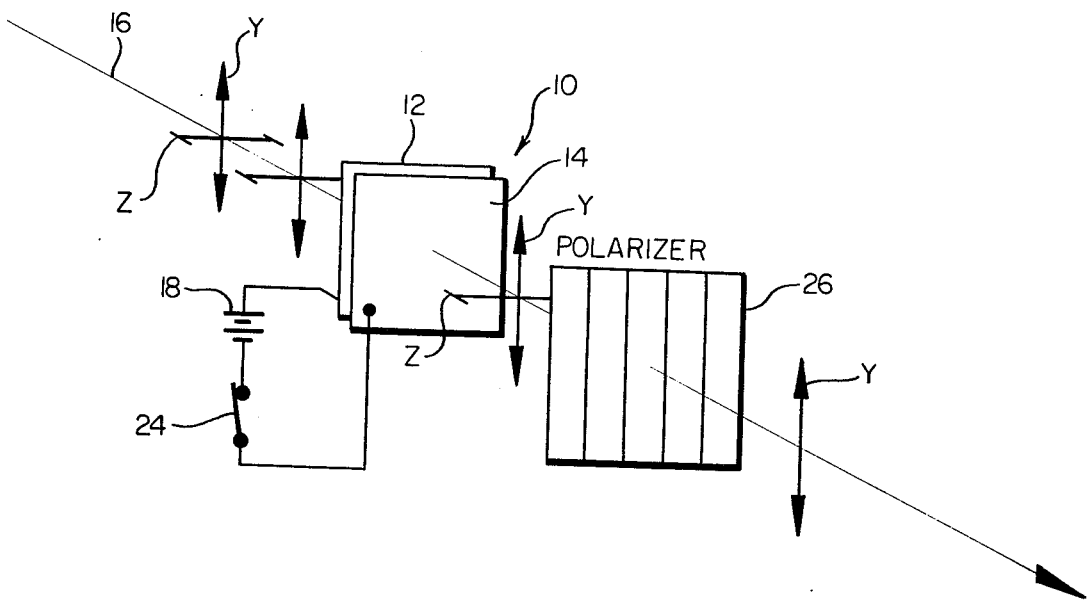
FIG. 2 illustrates the apparatus for obtaining a second polarization component perpendicular to that of FIG. 1.

In FIG. 2, the switch 24 has been closed so as to apply an electric field between the liquid crystal cell walls 12 and 14. In this case, the impinging light 16 is not rotated as it passes through the liquid crystal cell 10. Generally, about three volts or more provides a sufficient electric field to prevent polarization rotation. Therefore, the Y component is now aligned with the plane of polarization of polarizer 26 and is coupled to the detector and analyzer 28.

Figure 4:
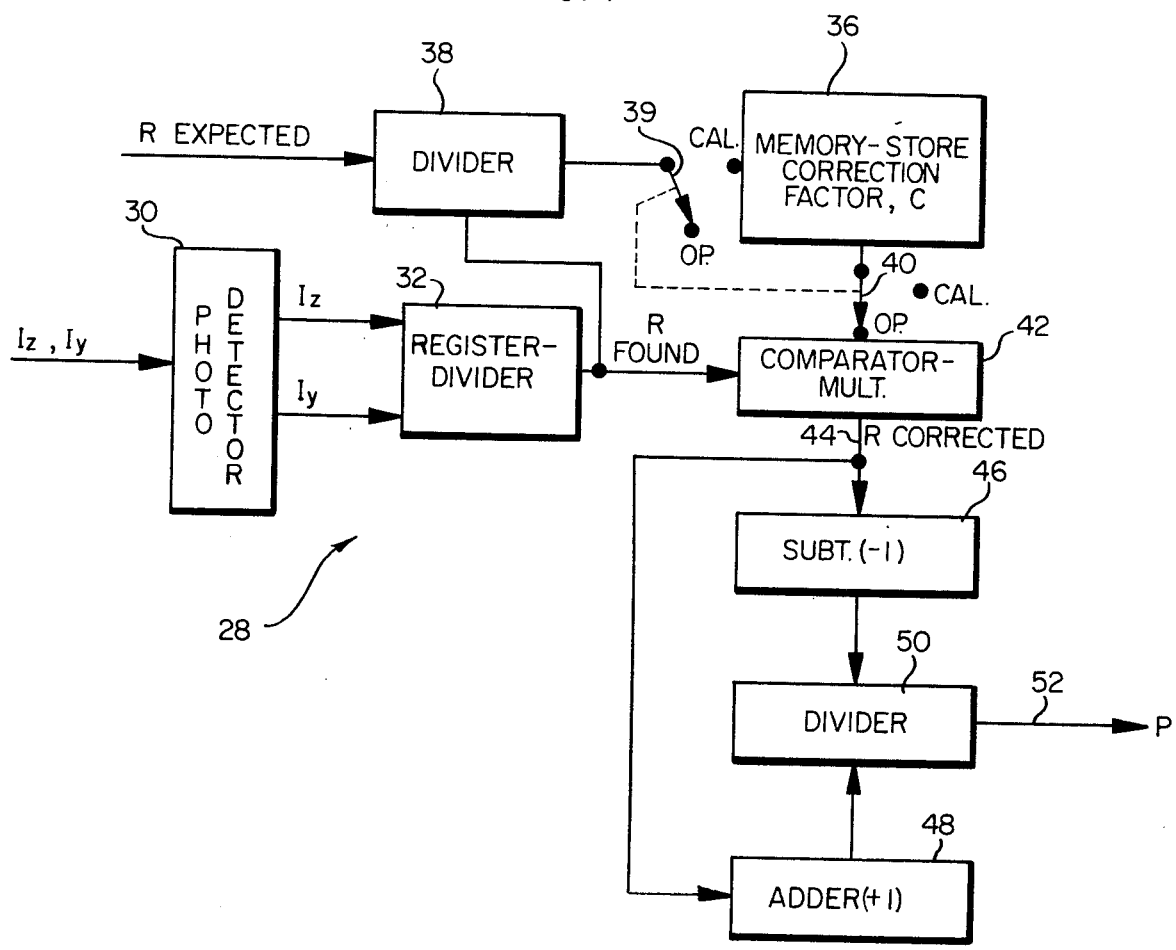
FIG. 4 is a schematic block diagram illustrating apparatus receiving the polarization components as shown in FIGS. 1 and 2 and for applying the appropriate correction factor in accordance with FIG. 3 to produce an accurate measurement of the degree of polarization.

FIG. 4 illustrates the apparatus comprising detector and analyzer 28. In particular, the Z and Y polarization components derived in accordance with FIGS. 1 and 2 are coupled to a photodetector 30 for conversion to corresponding electrical signals which are in turn coupled to a register-divider 32 thereby providing the ratio $I_z/I_y$, or R. It has been determined that if this value of R, measured using a liquid crystal as shown in FIGS. 1 and 2, is utilized in the aforementioned expression to derive the magnitude of polarization, P, for totally polarized light (where the full light intensity appears along the axis $I_y$ and the intensity $I_z$ is zero), there is normally obtained a magnitude P of about 0.86 or 14% below the theoretical or accepted polarization magnitude of 1.00. Most prior art polarization instruments described previously would obtain a polarization magnitude of about 0.95, i.e. 5% less than the theoretical or accepted P magnitude. Therefore, the directly measured polarization magnitudes using a liquid crystal are too inaccurate, and may not in practice be a usable technique for reliable instrumentation.

Figure 3:
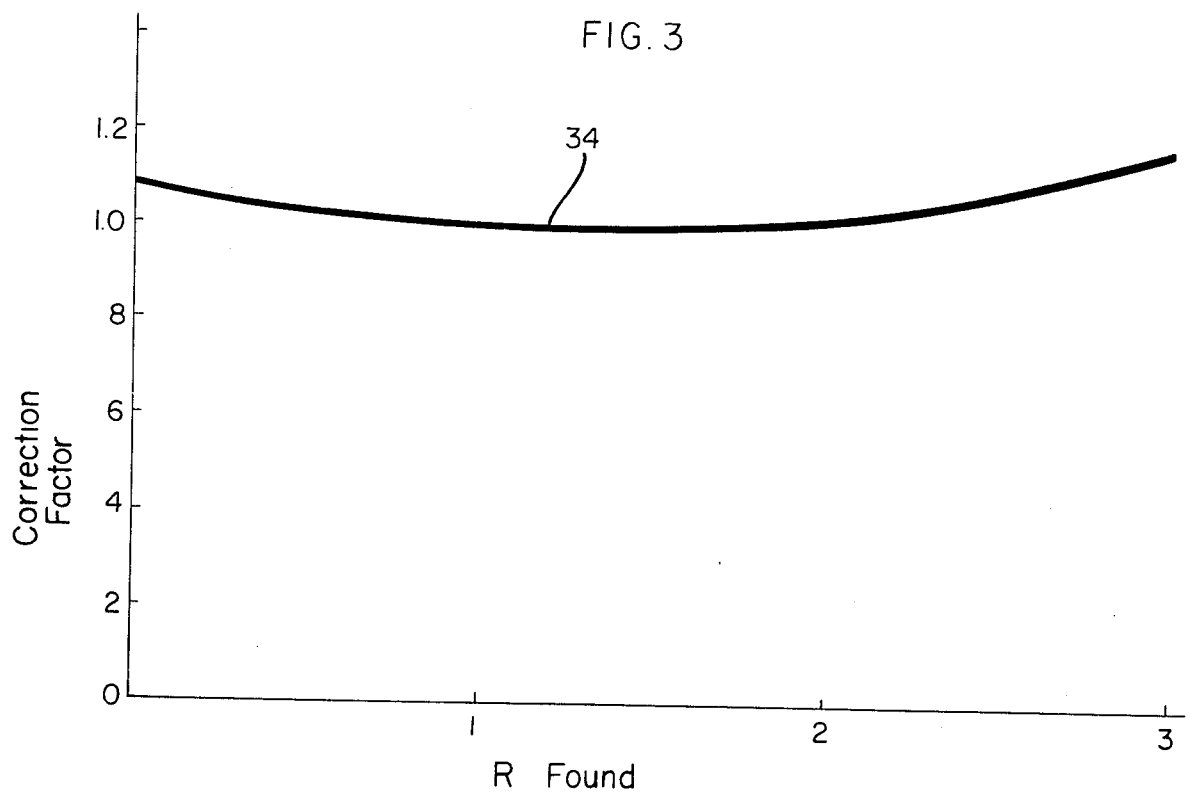
FIG. 3 illustrates a correction curve by which the polarization measurements obtained in FIGS. 1 and 2 are corrected to compensate for inherent rotational errors in a liquid crystal.

In accordance with the principles of the present invention, there is provided a calibration using standards with known polarizations. The standards are used to form a linear correction curve 34 shown in FIG. 3 so that the measured or found values of the ratio R using a liquid crystal can be automatically corrected by the apparatus 28.

A correction factor, C as a function of the measured or found values of the ratio R compared to R for known polarizations of the same light source is stored in memory 36. Specifically, when utilized for fluorescence polarization measurements the correction curve may be obtained by measuring the ratio R for example, for polarized light from three different fluorescent dyes using a liquid crystal in accordance with FIGS. 1 and 2, then determining the ratio R "expected" for polarized light from the same three dyes using a standard instrument such as a photon counting spectrofluorometer. Thus, the standard ratio R "expected" obtained from the spectrofluorometer for a particular dye is compared to the ratio R "measured" or "found" and a particular correction factor is obtained by divider 38 for insertion into the memory 36. The correction factor, C is expressed as a function of (R "expected")/(R "found"). The same procedure is used with two or more dyes to obtain additional values of the correction factor C as a function of the ratio R "found". With the ganged switch 39 and 40 in the calibration position shown in FIG. 4, the memory 36 is loaded to store the correction curve 34 illustrated in FIG. 3. Thus, when the switch 39 and 40 is returned to its operating position, the values of the ratio R "measured" or "found" during normal polarization measurements can be corrected with the values from the memory 36.

As indicated previously, prior attempts to utilize the desirable, inexpensive liquid crystals for measuring the degree of light polarization have led to errors due to crystal imperfections which cause leakage of light from undesired polarizations resulting in polarization rotational errors. Compared to conventional, expensive instruments for measuring polarization, the use of a liquid crystal, if uncorrected, can lead to errors in the measured magnitude of polarization of about 14%. Thus liquid crystals were not considered usable for this purpose. However, in accordance with the principles of the present invention, it was unexpectedly found that the inherent rotational error for each liquid crystal is generally constant, i.e., does not vary considerably over the range of the ratio R. Typically, as can be seen from FIG. 3, the correction factor, C, to be applied to compensate for the inherent error due to the liquid crystal imperfections does not vary considerably from about between 1.0–1.1 for the ratio R "measured" between about 1.0–3.0.

Accordingly, comparator-multiplier 42 selects the required correction factor, C from memory 36 for the respective input R "found" and provides a value for R "corrected" on output line 44 in accordance with C=(R "expected")/(R "found"). A subtractor 46 subtracts one from the corrected R value and a adder 48 adds one to the corrected R value so that the divider 50 takes the ratio $(R-1)/(R+1)$ and provides the measured degree of polarization, P on output line 52.

In operating the apparatus of the present invention illustrated in FIGS. 1–4, the following steps are therefore performed. During the initial calibration step, the ganged switches 39 and 40 are placed in the "calibrate" position and the ratio R is individually measured for light fluorescing from several dyes. The measured ratio R "found" is then compared with the known value R "expected" with known polarization, and the correction factor C=(R "expected")/(R "found") for each of the dyes is determined and stored in the memory 36. The switches 39 and 40 are then placed in the "operate" position shown in FIG. 4. Linearly polarized fluorescent light in accordance with FIG. 1 is coupled to the liquid crystal 10 and the component $I_z$ is placed in register 32. Next, in accordance with FIG. 2, switch 24 is closed to place an electric field across the liquid crystal 10 thereby placing the detected $I_y$ component in the register-divider 32 and enabling the uncorrected R "found" factor to be coupled to comparator-multiplier 42. Comparator 42 selects from memory 36 the required correction factor C in accordance with the detected, uncorrected R "found" and provides the corrected ratio R value on line 44. The corrected ratio R value is then used to derive the degree of polarization, P, in accordance with the ratio $(R-1)/(R+1)$.

While the preferred embodiment of the present invention as described herein utilizes liquid crystals since they are relatively inexpensive and an effective electric field can be applied with low voltages of about 3 volts or greater, one may also utilize crystals of other materials, such as lanthanum modified lead zirconate titanate, known as PLZT crystals. The PLZT crystal operates opposite to that of the liquid crystal in that with no applied electric field, the impinging plane of polarization is not rotated, whereas with an applied electric field to the PLZT crystal, the polarization plane is rotated approximately 90°. Therefore, if substituted for the liquid crystal in connection with the description herein in FIG. 1, the switch 24 would be closed to apply an electric field to the PLZT crystal and therefore rotate the impinging light plane of polarization to provide the Z component, whereas in FIG. 2, the switch 24 would be opened so the plane of polarization of light 16 would not be rotated thereby providing the Y component at the output of polarizer 26. One disadvantage of the PLZT, crystals, in addition to their relative high cost at the present time compared to liquid crystals, is that the voltage required to apply an effective electric field to obtain polarization rotation is about 800 volts, as compared to only slightly more than 3 volts for a liquid crystal.

Further, it is to be understood that this invention has been described in connection with measurements of fluorescence polarization to illustrate a preferred embodiment thereof and is not meant to so limit the scope of this invention. The principles can readily be applied to polarization measurements of other types of polarized light.

Also, if desired, suitable compensation for measured values of intensity $I_z$ and $I_y$ using a liquid crystal can be obtained in accordance with the teachings herein, so that the magnitude of polarization can be determined directly from the corrected $I_z$ and $I_y$ values. Correction factors for both $I_z$ and $I_y$ would be required in such a system, rather than only a single correction factor for R as described in the preferred embodiment illustrated herein.

While particular embodiments of the present invention have been shown and described, it will be obvious to those skilled in the art that various changes and modifications may be made without departing from the invention in its broader aspects. Accordingly, the aim of the appended claims is to cover all such changes and modifications as may fall within the true spirit and scope of the invention.

What is claimed is:

1. Apparatus for accurately determining the polarization magnitude of light emitted from a source in accordance with the expression $(I_z-I_y)/(I_z+I_y)$, $I_z$ being the intensity of one polarization component of said light at a first polarization angle, and $I_y$ being the intensity of a second polarization component of said light at a second polarization angle of 90° with respect to said first polarization angle, said apparatus comprising:

a polarizer having a fixed plane of polarization;

a liquid crystal intermediate said light source and said polarizer, said liquid crystal rotating the polarization of said light about 90° to enable said one light component to align with said polarizer plane of polarization and thereby pass through said polarizer;

said liquid crystal having an inherent polarization rotational error value;

means for applying an electric field to said liquid crystal to prevent said polarization rotation by said liquid crystal to enable said second light component to align with said polarizer plane of polarization and thereby pass through said polarizer;

detection means for detecting the value of $I_z$ of said one light component passing through said polarizer during rotation of said one light component by said liquid crystal, and for detecting the value of $I_y$ of said second light component passing through said polarizer during the application of said electric field to said liquid crystal; and measuring means coupled to said detection means for determining the corresponding magnitude of polarization of said light using said detected values of $I_z$ and $I_y$;

said measuring means including means for deriving the value of $R=I_z/I_y$, and means for determining the corresponding magnitude of polarization of said light from said expression $(R-1)/(R+1)$;

compensating means for correcting the derived values of $R=I_z/I_y$ to compensate for said polarization rotational errors inherent in said liquid crystal;

said compensating means including memory means for storing a respective correction factor, C, determined for a range of said derived R values as a function of R values for known magnitudes of polarization during an initial calibration operation;

said compensating means further including comparator means responsive to a respective derived R value for selecting a respective correction factor C, from said memory means during determination of said magnitude of polarization; and said measuring means includes for applying said selected respective correction factor, C, to a respective derived value of R during determination of said magnitude of polarization.

2. A method for determining the polarization magnitude of light emitted from a source in accordance with the expression $(I_z-I_y)/(I_z+I_y)$, $I_z$ being the intensity of one polarization component of said light at a first polarization angle, and $I_y$ being the intensity of a second polarization component of said light at a second polarization angle of 90° with respect to said first polarization angle, said method comprising the steps of:

providing a polarizer having a fixed plane of polarization;

providing a liquid crystal intermediate said light source and said polarizer, said liquid crystal having an inherent polarization rotational error value;

selectively applying an electric field to said crystal to sequentially align each of said y and z polarization components with said polarizer plane of polarization;

sequentially detecting the values of said y and z polarization components and determining the corresponding magnitude of polarization using said detected values;
sequentially detecting the values of said y and z polarization components to derive a value of $R = I_z/I_y$;
storing a respective correction factor, C, determined for a range of said derived R values as a function of R values for known magnitudes of polarization during an initial calibration operation to compensate for said polarization rotational errors inherent in said liquid crystal;
during determination of said magnitude of polarization, comparing a respective derived R value and selecting a respective stored connection factor, C;
applying said selected respective correction factor, C, to a respective derived value of R during determination of said magnitude of polarization; and
determining the corresponding magnitude of polarization of said light from the expression $(R-1)/(R+1)$.

* * * * *